United States Patent [19]
Hida

[11] 3,934,939
[45] Jan. 27, 1976

[54] BRAKING PRESSURE REGULATING DEVICE FOR A VEHICLE BRAKING SYSTEM

[75] Inventor: Takashi Hida, Kariya, Japan

[73] Assignee: Aisin Seiki Kabushiki Kaisha, Japan

[22] Filed: Apr. 12, 1974

[21] Appl. No.: 460,618

Related U.S. Application Data
[63] Continuation-in-part of Ser. No. 246,752, April 24, 1972, abandoned.

[30] Foreign Application Priority Data
Apr. 23, 1971  Japan.................. 46-26904

[52] U.S. Cl........ 303/21 A; 188/181 C; 303/21 BE; 303/21 F
[51] Int. Cl.²......................................... B60T 8/10
[58] Field of Search............ 188/181 C; 303/20, 21; 307/10 R; 317/5; 324/161; 340/53, 62, 263

[56] References Cited
UNITED STATES PATENTS

| | | | |
|---|---|---|---|
| 3,382,012 | 5/1968 | Lucien............................. | 303/21 P |
| 3,401,984 | 9/1968 | Williams et al................. | 303/21 BE |
| 3,540,781 | 11/1970 | Okamoto et al................ | 303/21 BE |
| 3,718,374 | 2/1973 | Ochia.............................. | 303/21 A |
| 3,737,201 | 6/1973 | Okamoto et al................. | 303/21 A |
| 3,762,775 | 10/1973 | Ochiai............................. | 303/21 A X |
| 3,771,839 | 11/1973 | Fink................................ | 303/21 BE |
| 3,807,811 | 4/1974 | Nakamura et al.............. | 303/21 BE |

Primary Examiner—Trygve M. Blix
Assistant Examiner—Stephen G. Kunin
Attorney, Agent, or Firm—Holman & Stern

[57] ABSTRACT

An improvement in and relating to powered driven and wheeled vehicles; more specifically, to improvements in wheel brake systems of such vehicles, wherein a condenser will charge in a voltage responsive to the wheel rotation at the commencement of a brake applying operation, and the discharge speed (or discharge voltage) of the condenser is made variable in response to foot brake pedal pressure. A comparison is made between this voltage and a wheel rotation-responsive voltage during the braking operation and derived through a separate part of the electronic circuit concerned. When the latter voltage is higher than the former voltage, the wheel cylinder pressure is increased through the intermediary of a pressure intensifier, until the both voltages are brought into coincidence with each other. In this way, the liquid pressure as applied to the wheel cylinder is made always to response to the pedal pressure.

8 Claims, 3 Drawing Figures

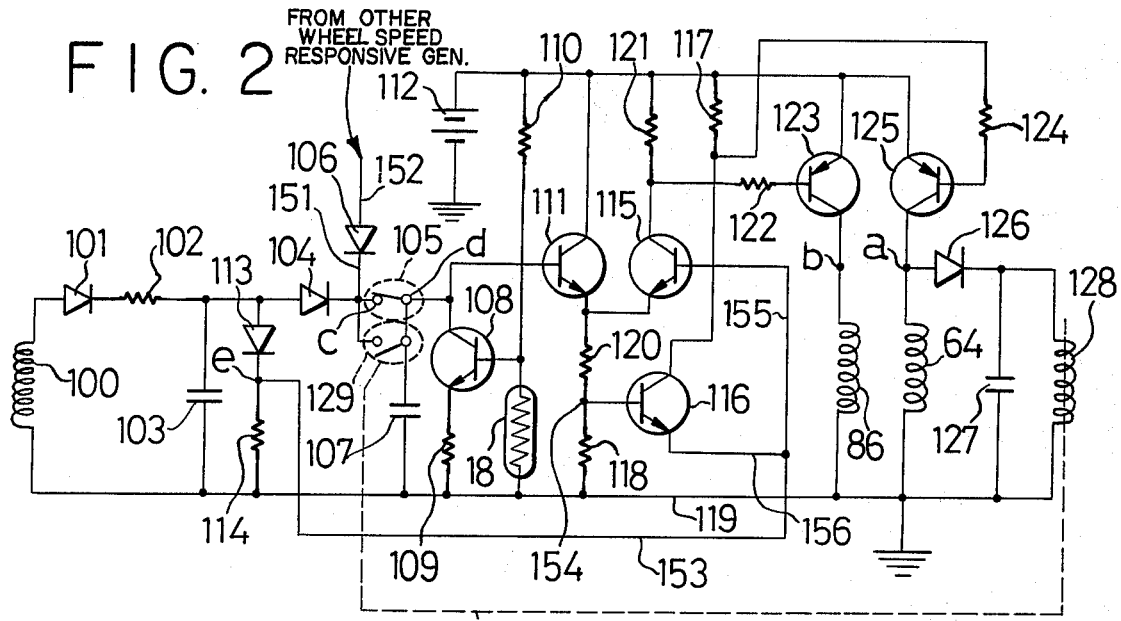
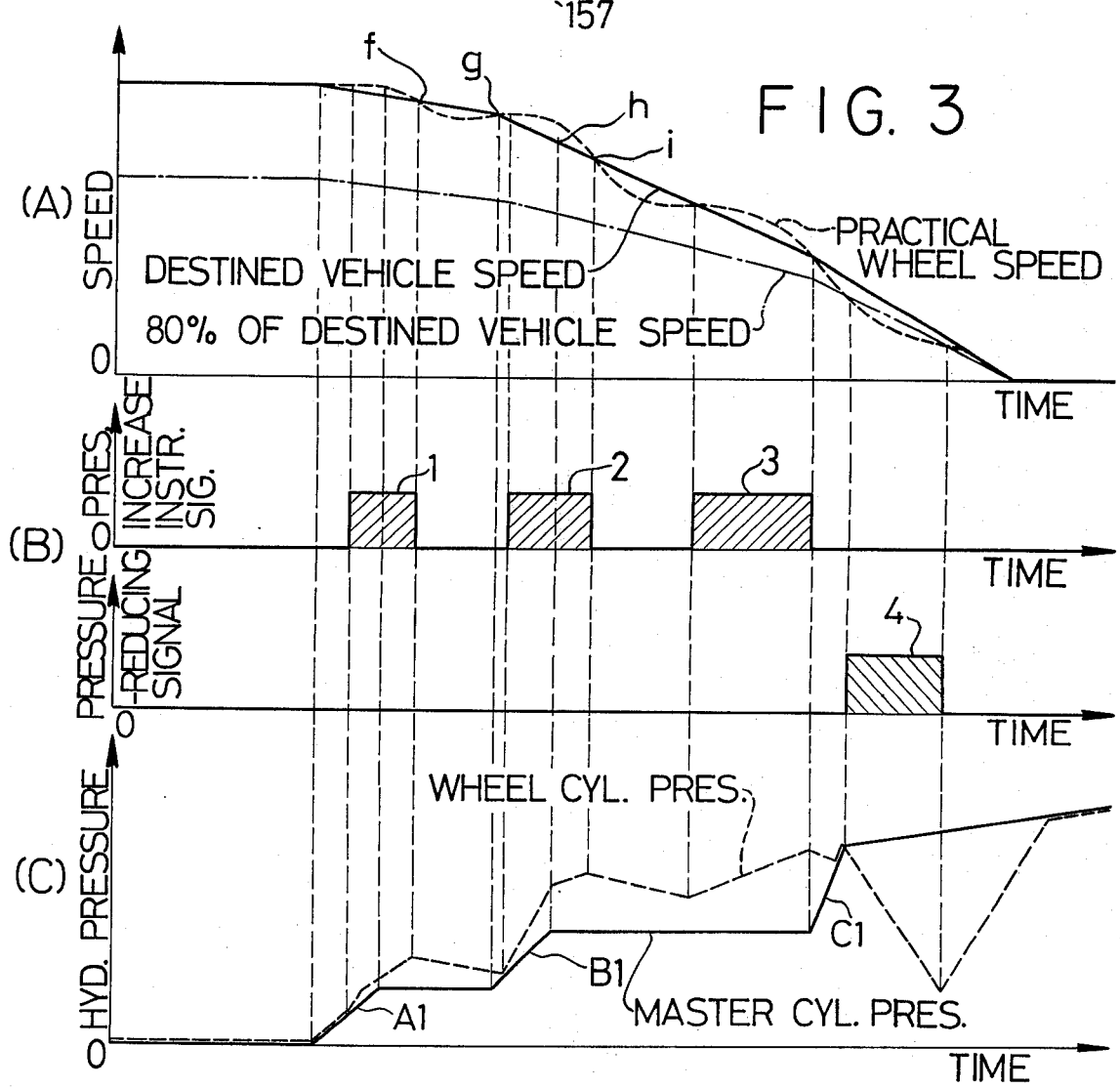

3,934,939

BRAKING PRESSURE REGULATING DEVICE FOR A VEHICLE BRAKING SYSTEM

This application is a continuation-in-part of application Ser. No. 246,752 filed Apr. 24, 1972, now abandoned.

BACKGROUND OF THE INVENTION

This invention relates to improvements in and relating to powered driven and wheeled vehicles; more specifically, it relates to improvements in wheel brake systems of such vehicles.

As is commonly known, it is highly desirous to provide a braking force to the vehicle wheel which is as precisely responsive as possible to the braking effort applied to a brake pedal or responsive as possible to the like braking means or the master cylinder pressure.

In practical braking systems, however, the above desired correspondence may be frequently disturbed by virtue of the very existence of unavoidable change of or fluctuation in the friction coefficient appearing between the brake shoe means and the brake drum means, as an example of the braking means and to-be-braked means of a conventional vehicle wheel braking system, as being caused by frequently encountered disorder and/or excessive wear of the related parts.

SUMMARY OF THE INVENTION

It is therefore an object of the present invention to provide an improved vehicle brake system providing a braking force in substantial proportion to the foot pressure or the like braking effort applied to a brake pedal or the like braking member, being effected to a possible least degree by occasionally invited variations in the frictional coefficient appearing between the frictionally braking means such as, for instance, brake shoes and the rotatable braked means such as a brake drum rotatable in unison with the vehicle wheel, thereby eliminating conventional vehicle driver's fear from occasionally encountered loose braking effect or conversely by excess braking.

It is a further and subsidiary object of the invention to provide an improved vehicle wheel braking system of the above kind, capable of automatically reducing the hydraulic braking force applied to the wheel being braked when the latter is locked or brought into its lock-impending state.

These and further objects, features and advantages of the invention will become more apparent when read the following detailed description of the invention by reference to the accompanying drawings illustrative substantially of a preferred embodiment of the invention.

BRIEF DESCRIPTION OF THE DRAWINGS

In the drawings:

FIG. 2 is a wiring diagram of the electronic circuit adapted for control of several main parts appearing in FIG. 1.

FIG. 3 is a schematic diagram for illustration of the operating modes of several main constituents employed in the embodiment.

DETAILED DESCRIPTION OF THE PREFERRED EMBODIMENT

Figure 1:
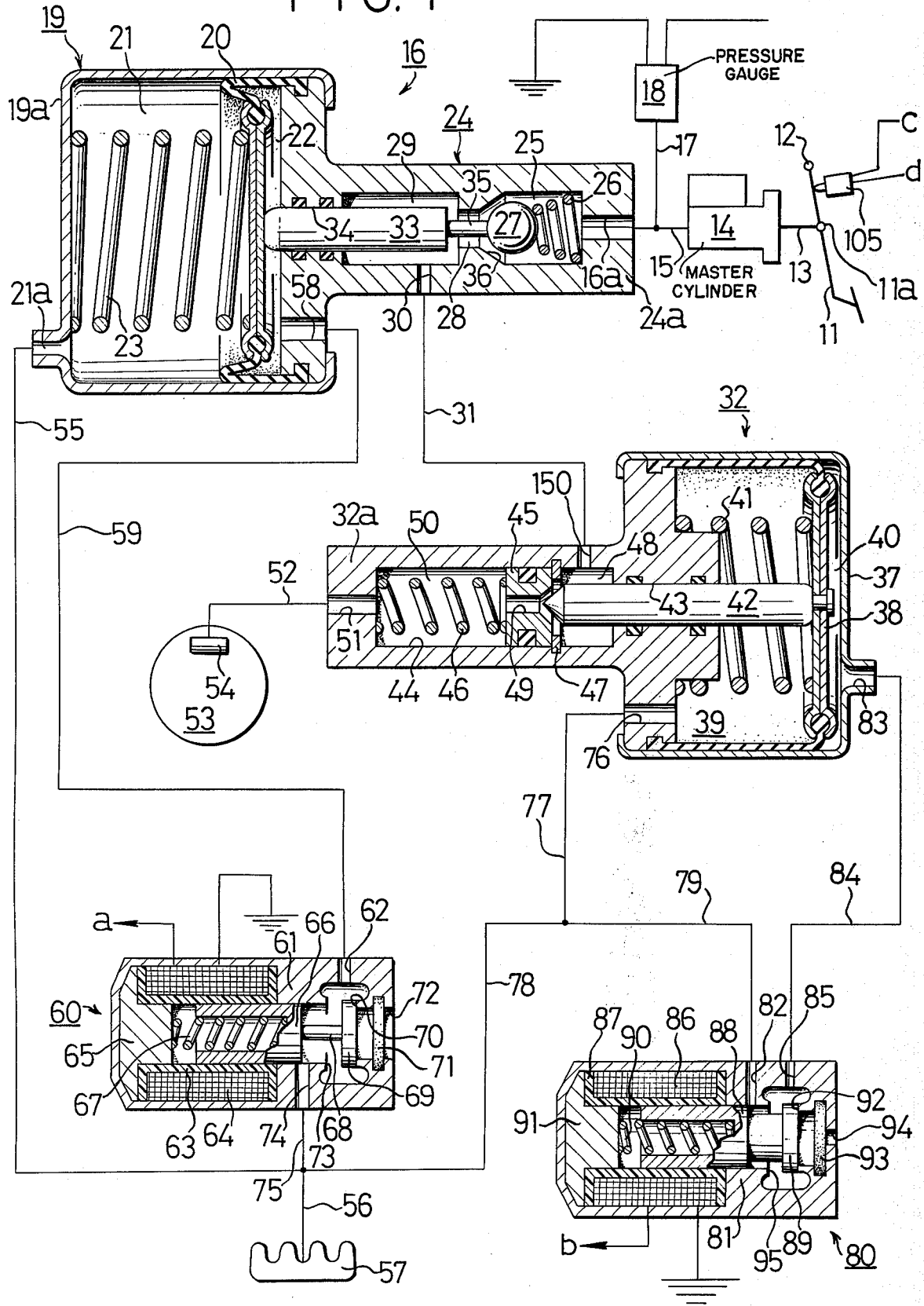
FIG. 1 is a schematic arrangement view of substantially mechanical parts of the vehicle wheel braking system according to this invention, wherein, however, several parts are shown in their axial section and several parts are demonstrated substantially in their blocks.

Referring to the drawings, substantially a preferred embodiment of the invention will now be described in detail.

In FIG. 1, numeral 11 represents a brake pedal which is pivotably mounted at 12 on the chassis of an automotive vehicle, although not specifically shown. A rod 13 is pivotally connected with the pedal 11 at an intermediate point 11a between both ends thereof. The opposite end of the rod 13 is connected with a master piston, not shown, which is slidably mounted in a master cylinder of conventional design. The output end of the master cylinder 14 is hydraulically connected through a conduit 15 to the inlet port 16a of a pressure-reducing mechanism 16, and through conduits 15;17 to a pressure gauge 18; only schematically shown in a block only for simplicity.

The pressure-reducing mechanism 16 comprises a diaphragm-containing section 19 and a shut-off valve section 24. The first or diaphragm section 19 comprises a cover 19a the interior space of which is divided into two separate chambers 21;22 by the provision of a flexibly movable diaphragm 20, a spring 23 being provided between the cover 19a and diaphragm 20 for urging the latter to move rightwards in FIG. 1. The second or valve section 24 comprises a housing 24a which is mechanically and rigidly connected with said cover 19a and formed axially with a liquid chamber 25 which is kept in direct fluid communication with the inlet port 16a and contains movably a ball valve 27.

A valve spring 26 is mounted in the liquid chamber 25, so as to urge the ball valve 27 to move to the left in FIG. 1. A further liquid chamber 29 is formed within the interior of housing 24a and kept normally in fluid communication through a reduced passage 28. The chamber 29 is hydraulically connected through a lateral port 30 formed through the housing 24a, and a conduit 31 to a lateral port 150 formed through the housing 32a of a pressure-intensifier 32.

A plunger 33 is slidably mounted in a cylinder bore 34 formed in the housing 24a and formed integrally with a reduced stem 35 kept in pressure contact with the ball valve 27. In the position shown in FIG. 1, the ball valve is kept in its open position by this stem 27 against the action of valve spring 26, thus receding from contact with its mating valve seat 36 which is constituted by the cone-shaped transition area between the cylindrical wall surface of first fluid chamber 25 and the right-hand end extremity of the reduced passage 28 in FIG. 1.

The intensifier 32 comprises a diaphragm-containing section 37 and a cylinder section comprising said housing 32a. The diaphragm-containing section comprising a cover housing 37 in which there are provided two separate pneumatic chambers 39 and 40 by the provision of a resilient and movable diaphragm 38. There is provided an urging spring 41 which urges the diaphragm 38 to move rightwards in FIG. 1.

Numeral 42 represents a plunger which projects slidably through a reduced bore 43 formed through the inside end wall part of the cylinder 32a. A piston 45 is slidably received in a chamber 50 defined substantially by the inside wall surface 44 of the cylinder section. In the latter, a further chamber 48 is provided and both chambers 48 and 50 are defined by the piston 45. The plunger 42 has a pointed inner end which is adapted for cooperation with the axial bore 49 which is formed through the piston 45. An urging spring 46 is provided, thereby the piston 45 being kept in pressure contact with a stop ring 47 formed into a snap ring and kept in position on the wall surface 44 for limiting the right-hand moving stroke of said piston 45 as shown in FIG. 1. The port 150 opens to the chamber 48 which is adapted for being hydraulically connected through axial bore 49, chamber 50, an axial port 51 drilled through the outer end wall of cylinder member 32a and a piping 52 to at least one of the wheel brake cylinders of wheels 53 of the vehicle, being shown schematically and representatively at 54.

Pneumatic chamber 21 is provided with a port 21a which is pneumatically connected through pipings 55 and 56 to the intake manifold 57, only schematically shown, of the drive internal combustion engine, not shown, of the vehicle.

Chamber 22 is provided with a port 58 which is pneumatically connected through a piping 59 to a port 62 formed through the wall of housing 61 of a pressure-reducing change over valve unit 60. The housing 61 is provided with a non-magnetic bobbin 63 on which a solenoid coil 64 is wound.

A plug member 65 is rigidly slid onto the housing 61, while a plunger 66 is slidably mounted in the latter, a spring 67 being inserted between the plug member and the plunger, so as to urge the latter to the right-hand direction in FIG. 1. The plunger 66 is provided rigidly with reduced stem 68 carrying a disc valve member 69 normally kept in pressure contact with one of the oppositely arranged valve seats 69 and 70 formed in the housing.

Numeral 71 represents a pervious air filter disc positioned across an air intake passage 72 for cleaning purpose of the intake air from open atmosphere, as will be more fully described hereinafter. The housing 61 is formed with a further port 74 is kept in fluid communication through conduits 75 and 56 with said intake manifold 57.

Pneumatic chamber 39 of the intensifier 32 is kept in fluid communication through conduits 77, 78 and 56 with said intake manifold 57, and through conduits 77 and 79 with a port 82 which is formed through the wall of housing 81 of the valve unit 80. Chamber 40 is kept in fluid communication through port 83 and conduit 84 to a further port 85 formed through the wall of housing 81.

Solenoid coil 86 is wound on a non-magnetic bobbin 87 rigidly mounted in the housing 81 which contains slidably a plunger 88 carrying at its outer end a valve disc 89 and is backed up by an urging spring 90. This spring 90 is inserted between a plug 91 slid onto the housing 81, and said plunger 88, thus the latter being resiliently urged to move in the right-hand direction in FIG. 1. The disc valve 89 is kept in pressure contact with a valve seat 92 which is arranged in opposition to a further seat 95 formed on the interior wall surface of housing 81. Numeral 93 represents a pervious air filter disc which is positioned across an air intake passage 94 formed through the end wall of housing 81 and adapted for cleaning the intake air from the ambient atmosphere, as will be described more specifically hereinafter.

Next, referring to FIG. 2, the electronic circuit employed in the vehicle braking system according to this invention will be described in detail hereinbelow.

Numeral 100 represents only schematically a generator which is mounted on a vehicle wheel or on a related member, not shown, rotatable in unison therewith, for generating an A.C. voltage having an amplitude responsive to occasional rotational speed of the vehicle wheel as at 53. One end of this generator 100 is connected electrically through a half wave rectifier diode 101 and a smoothing resistor 102 for supplying a corresponding D.C. voltage responsive to the wheel speed, to one side of a condenser 103, while the opposite side of the latter is directly connected with the opposite side of the generator 100. Thus, it will be seen that the voltage across the condenser 103 is responsive to the rotational speed of the wheel.

One end of condenser 103 is connected electrically through a diode 104 to a stationary contact $c$ of stop switch 105 which is shown also in FIG. 1. As may be easily seen from the drawing, when brake pedal 11 is depressed, the stop switch 105 is opened. The stationary contact $c$ thereof is arranged to receive through a diode 106 and a leads 151 and 152 from a certain circuit, not shown, similar to the circuit part so far shown and described a D.C. voltage in response to occasional rotational speed of a further vehicle wheel other than that shown referred to above.

Stop switch 105 is designed and arranged to cooperate with a further stationary contact $d$ which is electrically connected with a condenser 107 which is adapted for establishing a desirous vehicle speed. A discharge circuit to be described is connected in parallel to the condenser 107, said discharge circuit being adapted for discharging the accumulated voltage at the condenser 107 at a certain predetermined slope when the brake pedal 11 is depressed with a constant foot pressure applied thereto. This discharge circuit comprises said condenser 107, transistor 108, resistor 109, pressure indicator 18 and a resistor 110 which are arranged and electrically connected with each other as shown. The pressure indicator 18 is of a resistor type pressure sensor, although only schematically shown, which represents a higher electrical resistance value with higher output liquid pressure from the master cylinder 14.

The collector electrode of the transistor 108 is connected to the base electrode of a transistor 111, while the base electrode of the transistor 108 is connected through resistor 110 to a voltage source 112. In parallel with the condenser 103, a series connection of diode 113 and resistor 114 is connected Junction $e$ positioned between diode 113 and resistor 114 is connected through leads 153, 155 and 156 to the base electrode of transistor 115 and the emitter electrode of transistor 116, thereby providing a comparator adapted for performing a comparison between the desired and established vehicle speed and the practical rotational speed of the vehicle wheel selected out specifically.

The collector electrode of transistor 116 is connected electrically through resistor 117 to voltage source 112, while the base electrode of said transistor 116 is connected with a junction point 154 between resistors 118 and 120. The resistor 118 is directly connected at its opposite side to an earth conductor 119. Resistor 118 and 120 serve as a voltage divider by which the base voltage of transistor 116 amounts to a certain percentage, such as 80%, of the base voltage at the transistor 111. In this way, the base voltage at transistor 111 is selected to correspond to the desirous or destined vehicle speed and the base voltage at transistor 116 corresponds to 80% thereof, as demonstrated in FIG. 3 at (A).

The collector electrode of transistor 115 is electrically connected through a resistor 121 to the voltage source 112, while the emitter electrode of the transistor 115 is connected to the emitter electrode of transistor 111. The collector electrode of transistor 115 is connected through a resistor 122 to the base electrode of a transistor 123 adapted for energizing the solenoid 86, so as to actuate the intensifier 32, as will be more fully described hereinafter. The emitter electrode of transistor 123 is electrically connected to the voltage source 112, while the collector electrode of the transistor 123 is connected through said solenoid 86 to earth conductor 119.

The collector electrode of transistor 116 is connected through a resistor 124 to the base electrode of a transistor 125 adapted for energization of solenoid 64, so as to actuate the pressure-reducing unit 16.

The emitter electrode of transistor 125 is electrically connected to the voltage source 112, while the collector electrode of the transistor is earthed through said solenoid 64. Across the solenoid 64, a series connection of a diode 126 and a retarding condenser 127 is connected. Further, a relay 128 is connected across the condenser 127. As hinted by a dotted line 157, the relay 128 is operatively connected with the switch 129 which is arranged in parallel to the stop switch 105. With the relay 128 energized, the normally open switch 129 is caused to close.

The operation of the vehicle braking system so far shown and described is as follows.

The mechanical arrangement shown in FIG. 1 is shown in its off-service or non-braking position. Under this condition, vacuum pressure is conveyed from the engine intake manifold 57 through 56 and 55; 56, 75 and 59; 56, 78 and 77; 56, 78, and 84 to pneumatic chambers 21 and 22 of the pressure-reducing mechanism 16, and to pneumatic chambers 39 and 40 of the intensifier 32, respectively, when the drive engine is running.

When an operator or vehicle driver depresses brake pedal 11 for initiation of braking, the rod 13 will be shifted in the leftward direction in FIG. 1, thereby the master piston being advanced and an elevated hydraulic output pressure for the braking being conveyed from the master cylinder 14 through conduit 15 to the liquid chamber 25 of the pressure reducer 16 and through conduit 17 to the pressure indicator 18. On the other hand, the stop switch 105 is opened by the depression of the brake pedal 11.

The hydraulic braking pressure conveyed to the liquid chamber 25 will pass through the reduced passage 28, liquid chamber 29, conduit 31 and port 150 to the liquid chamber 48 of intensifier 32, thence further conveyed through axial bore 49 of piston 45, liquid chamber 50, port 51 and conduit 52 to the wheel cylinder 54 of the wheel 53 which is therefore subjected to braking action and begins to decelerate.

Next, turning to the operation of the electronic circuit shown in FIG. 2, a wheel speed-responsive signal delivered from the generator 100 corresponding to occasional revolutional speed of a certain vehicle wheel as at 53 is conveyed through diode 101, resistor 102 and diode 104, thence further through stop switch 105 (which is closed during off-braking period) to the base electrode of transistor 111. The signal is conveyed at the same time, through diode 113 to the base electrode of transistor 115.

Under the off-braking period during running of the vehicle, it can be assumed that the vehicle running speed corresponds to the wheel speed, since there will be no slippage between the wheel(s) and the traffic surface on which the vehicle is travelling.

Since the speed-responsive signal delivered from generator 100 is being applied to the base electrodes of the transistors 111 and 115 constituting in combination a differential amplifier, these transistors are both non-conductive, thus the transistors 123 and 125 being also non-conductive. Therefore, solenoids 86 and 64 maintain their non-conducting state.

When the brake pedal 11 is being depressed, the foot pressure expressed in terms of the master cylinder pressure will increase as shown at A1, (C), FIG. 3 and the stop switch 105 is opened. From this reason, the accumulated and charged voltage responsive to the wheel speed in advance of the brake application in the condenser 107 will begin to discharge through transistor 108 and resistor 109. This discharging voltage is established by the variable resistance appearing at the pressure sensor 18 which is connected with the base electrode of transistor 108.

It will be seen from the foregoing that with higher braking liquid pressure delivered from the master cylinder 14, the larger resistance will appear at the pressure sensor 18. In other words, with higher braking liquid pressure, the higher discharge voltage will appear at the condenser 107 and the higher potential will appear at the base electrode of transistor 111. The related parts are thus so designed and arranged that the potential appearing at the base of transistor 111 and thus the discharge potential at condenser 107 corresponds to the master cylinder pressure which corresponds in turn to the foot pressure exerted at pedal 11.

The discharging slope appearing at the condenser 107 is also variable and the desired or destined speed is determined by the discharge speed, on the one hand, and by the characteristics of the condenser, on the other hand. Therefore, the necessary condenser characteristics vary with the braking performance of the wheel braking system as a whole and the specific model of the vehicle and thus, can be determined upon execution of slight experiments, preferably during the design stage.

When the vehicle driver or an authorized personnel depresses the brake pedal 11 as was referred to above, so as to elevate the master cylinder pressure as at A1 in FIG. 3, (C), whereby the wheel is subjected to a braking effort as shown by the corresponding part of the wheel speed curve shown in a dotted line curve at (A) of FIG. 3, representing a corresponding wheel speed deceleration.

When it is now assumed that the voltage responsive to the practical wheel speed appearing on the said dotted line curve shown at (A), FIG. 3, be higher that the voltage corresponding to the discharge speed at condenser 107 as determined by the exerted foot pedal pressure as expressed by the slope curve A1, one of the transistors 115 which constitute in combination a differential amplifier, will become conductive and thus, the pressure-increasing transistor 123 will become also conductive. By the conduction of the transistor 123, the pressure-increasing solenoid 86 for the valve unit 80 is energized as shown at 1 of (B) and the plunger 88 is attracted leftwards in FIG. 1 against the action of spring 90. In this way, the valve disc 89 rigid with plunger 88 is separated from the hitherto cooperating seat 92 and then brought into contact with the opposite seat 95. Thus, ambient atmosphere will be introduced from the open atmosphere through port 94, air cleaning disc 93, port 85, conduit 84 and port 83 to the pneumatic or air chamber 40 of the intensifier 32. At this stage, vacuum is prevailing in the neighboring chamber 39. Thus, there appears a pressure differential across the diaphragm 38 which is flexed inwardly and the plunger 42 rigid therewith is urged to move leftwards in FIG. 1 against the action of spring 41. During this leftward movement of plunger 42, the latter is at first brought into engagement by the pointed end of the stem portion thereof with the right-hand enlarged end of the axial bore 49 of piston 45, thereby the fluid communication between conduit 31 and chamber 50 being interrupted. Then, the piston 45 is accompanied with further leftward movement of the plunger 42, so as to increase the liquid pressure in the chamber 50. Thus, an increased liquid pressure is supplied to the wheel cylinder 54.

With increase of the hydraulic braking pressure as supplied to the wheel cylinder 54, the rotational speed of the wheel 53 will be further reduced and the wheel speed-responsive voltage will correspondingly lower. Thus, finally, the both voltages will become equal to each other (refer to point $f$ at (A) and the transistors 111 and 115 become non-conductive. As the results, the pressure increase instruction signal will disappear.

With application of a higher pedal pressure as shown at B1 in FIG. 3, (C), a new destined vehicle speed is established by a new discharge speed at the condenser 107 corresponding to (A1 + B1) as shown by a new full line curve $g$-$h$ at (A), FIG. 3. In this case, when the wheel speed-responsive voltage is higher the condenser discharge speed, as similar as before, a second pressure increase instruction signal 2 will develop and an intensified braking pressure will be applied through wheel cylinder 54 to the wheel 53. When the both signal voltages become equal to each other (refer to point $i$ at (A), FIG. 3), then the second instruction signal 2 will disappear. Concerning a third instruction signal 3, the same as aforementioned will apply equal.

With further increased braking pressure as applied, as shown at C1 in (C) of FIG. 3, corresponding to the sum (A + B + C), and when the wheel speed responsive speed fed from the generator 100 to the emitter electrode of transistor 116 becomes lower than the voltage corresponding to 80% of the destined vehicle speed, as being applied to the base electrode of transistor 116, or in other words, when the rotational speed of the wheel suddenly drop below the said 80%-value, and the wheel attached with the generator 100 becomes locked or nearly locked, the transistor 116 becomes conductive and thus, the pressure-reducing transistor 125 will become also conductive (refer to pressure-reducing instruction signal 4 at (B), FIG. 3).

In this way, when the pressure-reducing transistor 125 becomes conductive, the solenoid 64 is energized and plunger 66 is attracted leftwards against the spring force at 67. Thus, valve disc 68 is separated from its seat 70 and brought into pressure contact with opposite seat 73. Air is induced thus from the ambient atmosphere through port 72, air cleaner disc 71, port 62, conduit 59 and port 58 into the chamber 22 of the pressure reducer 16, thereby air pressure differential developing across the diaphragm 20. Then, this diaphragm will be flexed leftwards against the action of spring 23. In this way, ball valve 27 and plunger 33 are shifted leftwards in FIG. 1 under the influence of the liquid pressure prevailing in the chambers 25 and 29 and of the spring pressure at 26.

With the closure of ball valve 27 by engagement with valve seat 35, the master cylinder pressure and the wheel cylinder pressure are separated from each other by the interruption thereat of fluid communication between the chambers 25 and 29.

With further leftward movement of the plunger 33, the effective volume of the liquid chamber 29 is correspondingly increased and the wheel cylinder pressure is correspondingly decreased. At the same time, relay 128 is energized, so as to close the normally open switch 129. This is performed for such purpose that at this stage, the wheel attached with the generator 100 may locked or almost locked and a rotational speed could not be derived therefrom.

By the above measure, a wheel speed responsive voltage is derived from a certain other one of the vehicle wheels and introduced into the circuit shown in FIG. 2 through the way of diode 106.

When the pressure decrease instruction signal as at 4, FIG. 3, (B), is delivered and the hydraulic brake pressure is reduced and the wheel speed is increased to the 80%-destined vehicle speed, the base and emitter electrodes of transistor 116 will have one and the same potential so that the transistor will become non-conductive. Then, the pressure reducer 16 will recover its position shown in FIG. 1.

In this way, the pressure decease instruction signal disappear and the plunger 33 will move rightwards so that ball valve 27 recedes from contact with seat 36, so as to equalize the pressures in the master cylinder and the chamber 29.

As will become aware from the foregoing description, a condenser will charge therein a voltage responsive to the wheel rotation at the beginning time of a brake applying operation, and the discharge speed (or discharge voltage) of the condenser is made variable in response to foot brake pedal pressure. A comparison is made between this voltage and a wheel rotation-responsive voltage during the braking operation and derived through a separate part of the electronic circuit concerned. When the latter voltage is higher than the former voltage, the wheel cylinder pressure is increased through the intermediary of a pressure intensifier, until the both voltages are brought into coincidence with each other. In this way, the liquid pressure as applied to the wheel cylinder is made always to response to the pedal pressure.

By adopting the above measure, application of a certain foot pressure to the brake pedal, a constant hydraulic braking pressure may be created and applied, and indeed, irrespective of the variation in the braking performance of the vehicle wheel braking system, difference in the vehicle models, and the like fluctuating conditions. In this way, fear of the vehicle driver, caused by the difference in the braking effect with equal manual effort and by an excessive brake applying effort, can substantially be removed.

In addition, a pressure reducer can be automatically activated so as to reduce the wheel brake cylinder pressure when the wheel should be locked or brought into a lock-impending state, thereby providing an optimal safety.

As the pedal pressure-sensing means, a pressure sensor adapted for sensing the master cylinder pressure has been used in the foregoing. But, the employment of such pressure-sensing means does not limit the invention in that sense. As an example, a carbon pile type pressure sensor can be employed for measuring the foot brake pressure so as to utilize it for the similar purpose.

The embodiments of the invention in which an exlusive property or privilege is claimed are as follows:

1. In a wheeled vehicle braking system of the type wherein braking pressure is applied to wheel cylinders of the vehicle wheels in response to pressure applied to a brake pedal and transmitted through a master cylinder, the improvement of a regulating device by which the braking pressure applied to the wheel cylinders is controlled in a fashion to ensure that the rate of reduction of the wheel speed corresponds to a deceleration rate set by the magnitude of the pressure applied to the brake pedal, said regulating device comprising:

sensor means for detecting the rotational speed of at least one wheel of said vehicle and developing a wheel speed-responsive voltage representative thereof;

memory means for storing said speed-responsive voltage, siad voltage being discharged in response to the application of braking pressure to said brake pedal;

proportioning means operatively connected through said master cylinder to said brake pedal for setting the rate of discharge of said voltage in response to the magnitude of braking pressure applied to said brake pedal;

comparator means for comparing said discharge voltage with said wheel speed-responsive voltage when said at least one wheel is being braked under said braking pressure; and pressure increasing means including a cut-off means for interrupting communication between said master cylinder and said wheel cylinders, said pressure increasing means supplying a pressure of a magnitude greater than that of the master cylinder pressure to said wheel cylinder when said wheel speed-responsive voltage is higher than said variably responding discharge voltage, thereby decreasing said wheel speed and ensuring that the rate of reduction of said wheel speed corresponds to the rate set by the pressure applied to the braking pedal.

2. A braking pressure regulating system as set forth in claim 1, comprising a further comparator means for detecting a locked state of the vehicle wheel, said comparator means comparing a voltage in proportion to said discharging voltage with the voltage from said sensor means; and pressure decreasing means actuated by said comparator means for reducing the hydraulic pressure of the wheel cylinder when the latter voltage becomes lower than the former voltage.

3. A braking pressure regulating system as set forth in claim 2, wherein said proportioned voltage is proportionally distributed from said discharging voltage by resistor means.

4. A braking pressure regulating system as set forth in claim 3, wherein said proportioned voltage is substantially, 80 percent of said discharging voltage.

5. A braking pressure regulating system as set forth in claim 2, comprising relay means which permits said further comparator means to communicate with sensor means of other wheels of said vehicle for obtaining therefrom said wheel responsive voltage.

6. A braking pressure regulating system as set forth in claim 1, wherein said comparator means is a transistor.

7. A braking pressure regulating system as set forth in claim 1, wherein a normally closed switch means is disposed between said sensor means and said memory means, said switch means being disconnected when a braking pressure is applied to cause discharge of said wheel speed-responsive voltage.

8. A braking pressure regulating system as set forth in claim 1, wherein said proportioning means comprises a pressure gauge connected to a master cylinder, said pressure gauge permitting said discharging voltage to vary in response to the braking effort supplied to the brake pedal.

* * * * *